US012700207B2

(12) United States Patent
Yoo et al.

(10) Patent No.: US 12,700,207 B2
(45) Date of Patent: Aug. 4, 2026

(54) METHOD AND APPARATUS WITH OBJECT DETECTION

(71) Applicant: Samsung Electronics Co., Ltd., Suwon-si (KR)

(72) Inventors: Byung In Yoo, Seoul (KR); SeungWook Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 453 days.

(21) Appl. No.: 18/078,311

(22) Filed: Dec. 9, 2022

(65) Prior Publication Data

US 2023/0186586 A1      Jun. 15, 2023

(30) Foreign Application Priority Data

Dec. 13, 2021      (KR) ......................... 10-2021-0177615

(51) Int. Cl.
*G06V 10/20*          (2022.01)
*G06V 10/82*          (2022.01)

(52) U.S. Cl.
CPC .............. *G06V 10/20* (2022.01); *G06V 10/82* (2022.01)

(58) Field of Classification Search
CPC ............................... G06V 10/20; G06V 10/82
See application file for complete search history.

(56) References Cited

U.S. PATENT DOCUMENTS 7,633,518 B2 * 12/2009 Beevor ................... G01V 3/104
                                                                    348/143
8,682,097 B2 *   3/2014 Steinberg .................. G06T 5/73
                                                                    382/275
9,638,883 B1 *   5/2017 Duparre ............. G02B 13/0085
10,671,878 B1 *   6/2020 Sarshogh .............. G06F 18/217
12,222,259 B1 *   2/2025 Liu ...................... G01M 13/045
(Continued)

FOREIGN PATENT DOCUMENTS

CN          107292240 A      10/2017
KR      10-2009-0049438 A       5/2009
(Continued)

OTHER PUBLICATIONS

Korean Office Action issued on Nov. 23, 2023, in counterpart Korean Patent Application No. 10-2021-0177615 (3 pages in English, 5 pages in Korean).

*Primary Examiner* — Kevin Ky
(74) *Attorney, Agent, or Firm* — NSIP Law

(57)          ABSTRACT

An electronic device generates a feature map from an input image to perform object detection, classifies one or more objects included in the input image and determines one or more object regions including the one or more objects based on the feature map, classifies an ROI included in at least a portion of the objects and determines the ROI included in the input image based on the feature map, displays on the input image an indicator identifying a first object region of a first object where the ROI is determined and a feature point of a first ROI of the first object, and displays on the input image an indicator identifying a second object region of a second object where the ROI is not determined and a feature point of the second object region, to perform post-processing differently according to whether an ROI is determined in an object.

18 Claims, 11 Drawing Sheets

(56)             References Cited

U.S. PATENT DOCUMENTS

| | | | | |
|---|---|---|---|---|
| 2010/0091330 | A1* | 4/2010 | Marchesotti | G06V 10/25 |
| | | | | 382/218 |
| 2016/0151026 | A1* | 6/2016 | Shibasaki | G06T 7/0016 |
| | | | | 378/10 |
| 2019/0332897 | A1* | 10/2019 | Chen | G06T 7/215 |
| 2020/0294231 | A1* | 9/2020 | Tosun | G06V 20/695 |
| 2021/0142214 | A1* | 5/2021 | Maalouf | A61B 5/02416 |
| 2021/0365707 | A1* | 11/2021 | Mao | H04N 23/80 |
| 2021/0397170 | A1* | 12/2021 | Zhou | G05B 19/41875 |
| 2022/0018981 | A1* | 1/2022 | Wang | G01V 1/282 |
| 2022/0261571 | A1* | 8/2022 | Derks | G06V 20/60 |
| 2022/0268938 | A1* | 8/2022 | Sivakumar | G01S 17/89 |
| 2022/0391615 | A1* | 12/2022 | Machefer | G06V 30/194 |
| 2022/0414869 | A1* | 12/2022 | Butler | G06T 7/11 |
| 2024/0408766 | A1* | 12/2024 | Wiersma | G06V 10/82 |

FOREIGN PATENT DOCUMENTS

| | | | |
|---|---|---|---|
| KR | 10-2014-0042024 | A | 4/2014 |
| KR | 10-2017-0006356 | A | 1/2017 |
| KR | 10-2018-0050892 | A | 5/2018 |
| KR | 10-2020-0076126 | A | 6/2020 |
| KR | 10-2020-0143193 | A | 12/2020 |
| KR | 10-2021-0095405 | A | 8/2021 |
| WO | WO 2011/092848 | A1 | 8/2011 |
| WO | WO 2017/181769 | A1 | 10/2017 |

* cited by examiner

Object region 140

ROI 170

Input image 110

METHOD AND APPARATUS WITH OBJECT DETECTION

CROSS-REFERENCE TO RELATED APPLICATIONS

This application claims the benefit under 35 USC § 119(a) of Korean Patent Application No. 10-2021-0177615, filed on Dec. 13, 2021, in the Korean Intellectual Property Office, the entire disclosure of which is incorporated herein by reference for all purposes.

BACKGROUND

1. Field

The following description relates to a method and an apparatus with object detection.

2. Description of Related Art

Object detection in an image may include, for example, a method of detecting a lane in an image obtained by a capturing device provided in an autonomous vehicle, a method of detecting a person or object in an image captured by a camera, and the like.

In an example, convolutional neural network (CNN) techniques may be implemented to classify an object in a captured image, and detect an object region through regression, and to classify and detect a human face in an image. A region-based CNN (R-CNN), a fast R-CNN, and faster R-CNN may be implemented to detect objects including, as a non-limiting example, a person, in an image.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

In a general aspect, a processor-implemented image processing method includes generating a feature map from an input image to perform object detection; classifying one or more objects comprised in the input image, and determining one or more object regions comprising the one or more objects, based on the generated feature map; classifying a region of interest (ROI) comprised in at least a portion of the one or more objects and determining the ROI comprised in the input image, based on the feature map; displaying, on the input image, an indicator that identifies a first object region of a first object where the ROI is determined and a feature point of a first ROI of the first object; and displaying on the input image an indicator that identifies a second object region of a second object where the ROI is not determined and a feature point of the second object region.

The input image may be a red, green, and blue (RGB) image.

The feature map may be generated based on ShuffleNet V2.

The classifying of the one or more objects, the determining of the object regions, the classifying of the ROI, and the determining of the ROI may be performed in parallel.

The first object and the second object may be at least a portion of a person, and the ROI may be a region corresponding to a face of the person.

The feature point of the first ROI and the feature point of the second object region may be preset coordinates.

The one or more object regions and the ROI may be determined based on bounding box regression.

In a general aspect, a device includes one or more processors, configured to: generate a feature map from an input image to perform object detection; classify one or more objects comprised in the input image, and determine one or more object regions comprising the one or more objects, based on the generated feature map; classify a region of interest (ROI) comprised in at least a portion of the one or more objects and determine the ROI comprised in the input image, based on the feature map; display, on the input image, an indicator that identifies a first object region of a first object where the ROI is determined and a feature point of a first ROI of the first object; and display on the input image an indicator that identifies a second object region of a second object where the ROI is not determined and a feature point of the second object region.

The device may include a memory, storing instructions that, when executed by the processor, configures the processor to perform the generating of the feature map, the classifying of the one or more objects, the determining of the one or more object regions, the classifying of the ROI, the displaying of the indicator that identifies a first object region, and the displaying of the indicator that identifies the second object region.

The device may include a capturing device configured to capture the input image on which the object detection is to be performed.

The input image may be a red, green, and blue (RGB) image.

The feature map may be generated based on ShuffleNet V2.

The classifying of the one or more objects, the determining the object regions, the classifying of the ROI, and the determining the ROI may be performed in parallel.

The first object and the second object may be at least a portion of a person, and the ROI may be a region corresponding to a face of the person.

The feature point of the first ROI and the feature point of the second object region may be preset coordinates.

Other features and aspects will be apparent from the following detailed description, the drawings, and the claims.

BRIEF DESCRIPTION OF DRAWINGS

Throughout the drawings and the detailed description, the same reference numerals may refer to the same, or like, elements. The drawings may not be to scale, and the relative size, proportions, and depiction of elements in the drawings may be exaggerated for clarity, illustration, and convenience.

DETAILED DESCRIPTION

Figure 1:
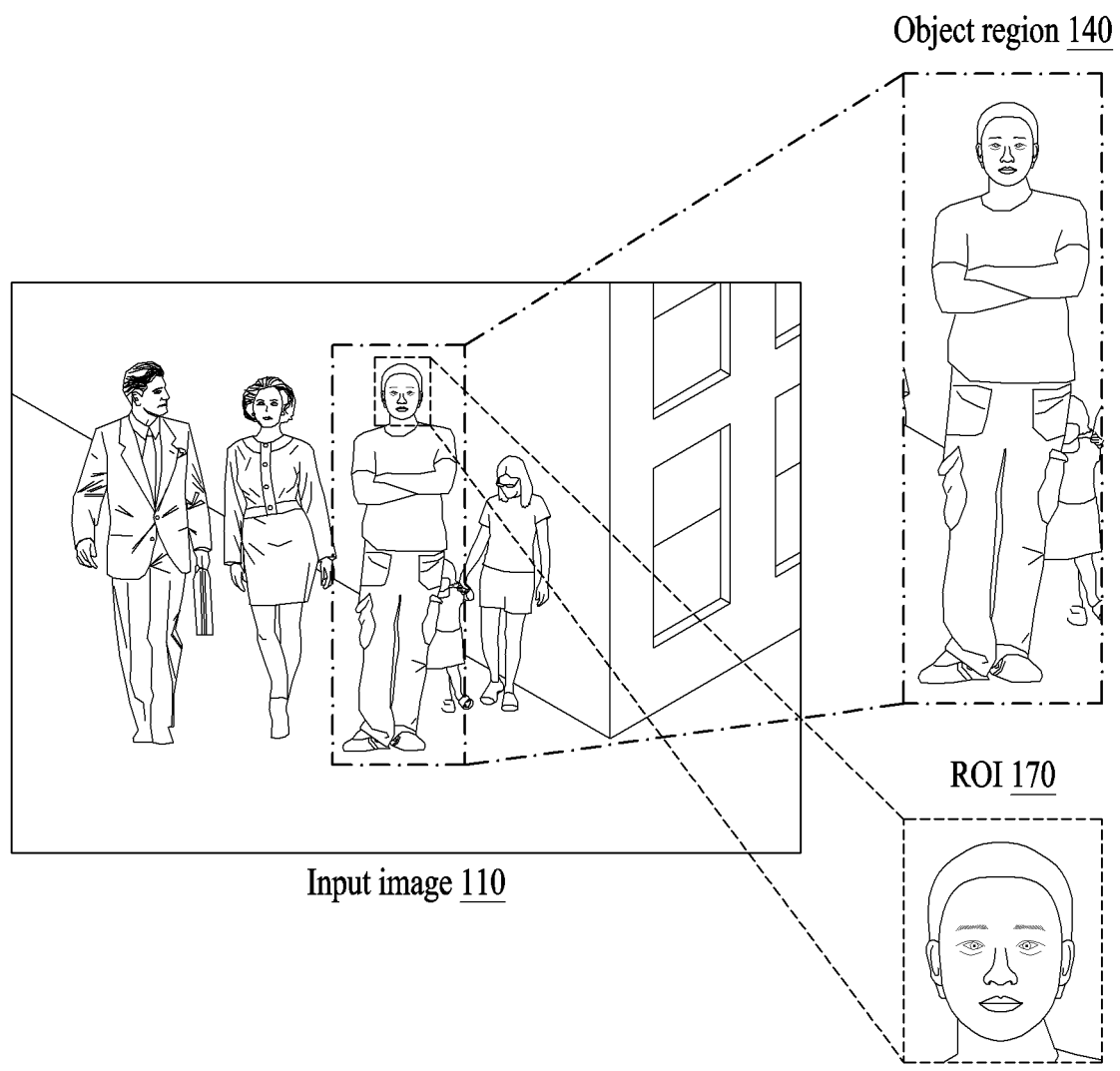
FIG. 1 illustrates an example object region and a region of interest (ROI) used to detect an object from an image, in accordance with one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

The examples may be implemented as various types of products, such as, as non-limiting examples, a personal computer (PC), a laptop computer, a tablet computer, a smartphone, a television (TV), a smart home appliance, an intelligent vehicle, a kiosk, and a wearable device. Hereinafter, examples will be described in detail with reference to the accompanying drawings. In the drawings, like reference numerals are used for like elements.

One or more examples may determine an object region and a region of interest (ROI) from an image, and processing the image according to whether the ROI has been determined.

FIG. 1 illustrates an example of an object region and a region of interest (ROI) of the object region that is used to detect an object in an image.

Referring to FIG. 1, an object region 140 and an ROI 170 may be detected in an input image 110. In an example, a convolutional neural network (CNN)-based image processing method may be used to detect the object region 140 and the ROI 170 of an object from the input image 110. The object may include, as a non-limiting example, a person, and the object region 140 may be detected from the input image 110 through, as examples, classification and regression. Through various CNN-based image processing methods, the person may be detected even when a portion of the person, for example, a face, is hidden.

An ROI 170 (e.g., a point of interest (POI)) may include at least a portion of an object region 140. In an example, an object may include a whole-body image of a person, and the ROI may be a region corresponding to a face of the person. For example, to track a person in an image, an object region corresponding to the entire body and an ROI corresponding to a face of the person may be detected.

A typical method of detecting a person, for example, a whole-body image of a person, and a face of the person will be described in detail with reference to FIGS. 2A and 2B.

Figure 2A:
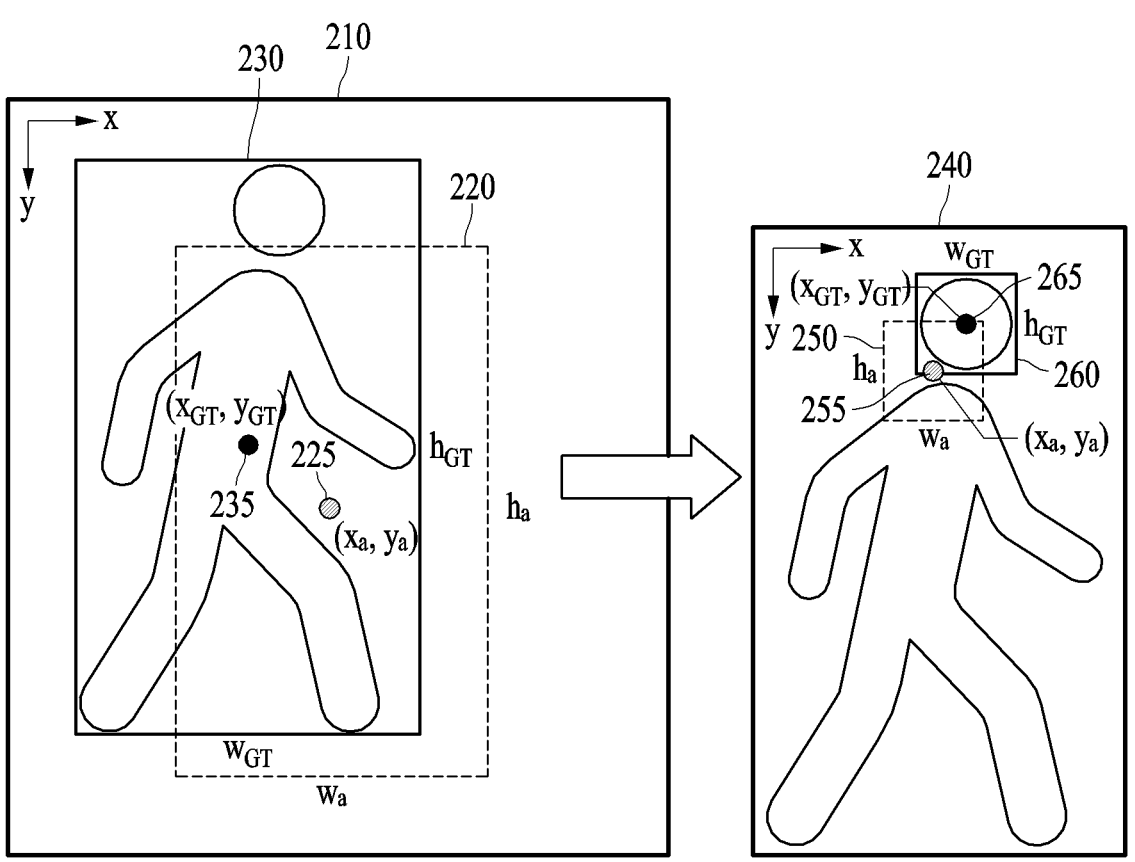
FIGS. 2A and 2B illustrate an example of a typical method of detecting a person and an ROI, in accordance with one or more embodiments.
Figure 2B:
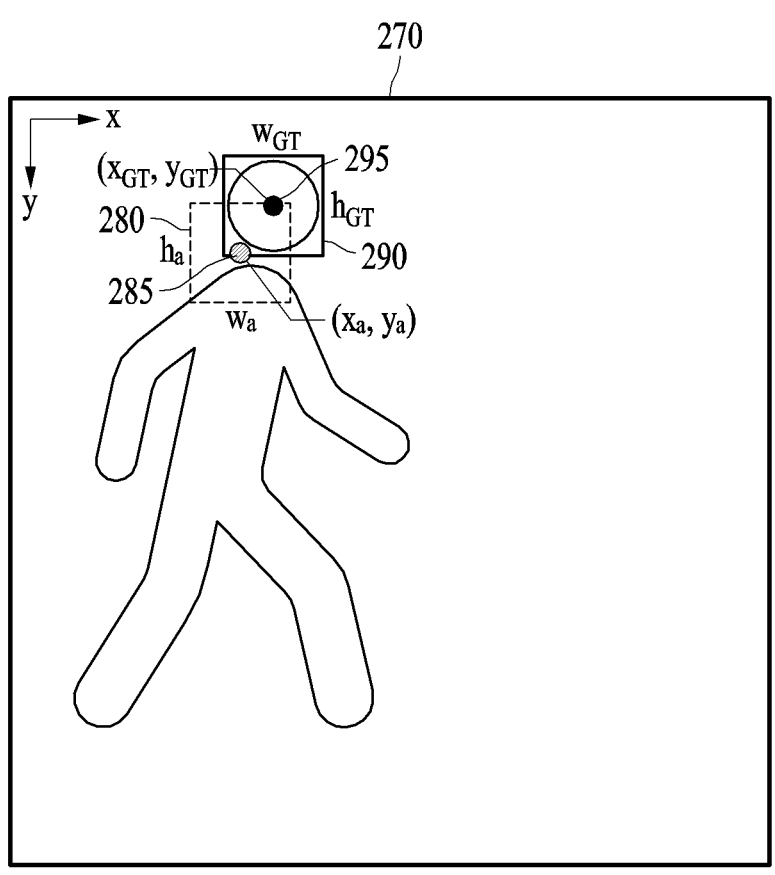

FIGS. 2A and 2B illustrate an example of a typical method of detecting an image, for example, a person, and an ROI of the detected image, in accordance with one or more embodiments.

Deep learning-based human tracking techniques may include a CNN. A neural network model may be configured to perform, as non-limiting examples, object classification, object recognition, and image recognition by mutually mapping input data and output data in a nonlinear relationship based on such deep learning. Such deep learning is indicative of processor implemented machine learning schemes.

Technological automation of pattern recognition or analyses, for example, has been implemented through processor implemented neural network models, as specialized computational architectures, that after substantial training may provide computationally intuitive mappings between input patterns and output patterns, pattern recognitions of input patterns, as non-limited examples. The trained capability of generating such mappings or performing such pattern recognitions may be referred to as a learning capability of the neural network. Such trained capabilities may also enable the specialized computational architecture to classify such an input pattern, or portion of the input pattern, as a member that belongs to one or more predetermined groups. Further, because of the specialized training, such specially trained neural network may thereby have a generalization capability of generating a relatively accurate or reliable output with respect to an input pattern that the neural network may not have been trained for, for example.

After being trained based on deep learning, the neural network may perform inference to achieve a training purpose by mapping input data and output data that are in a non-linear relationship to each other. As a non-limiting example, such deep learning is indicative of a processor-implemented machine learning scheme, e.g., to solve a particular issue, such as, but not limited to, image recognition or voice recognition, from a big data set. The deep learning may be understood as a process that solves an optimization issue to find a point at which energy is minimized while training the neural network based on prepared training data.

By implementing learning methods such as supervised, unsupervised learning, or reinforcement learning of the deep learning, a structure of the neural network, or weights and/or other parameters corresponding to a model, may be iteratively obtained, and the input data and the output data may be mapped to each other. A neural network may be trained to infer a desired result from an arbitrary input by iteratively changing the weights of various nodes through learning or training. For example, the weights and biases of a layer structure or between layers may be collectively referred to as connectivity of a neural network. Accordingly, the training of a neural network may denote establishing and training of such weighted connectivities.

An example of typical human detection and human face detection methods will be described with reference to FIGS. 2A and 2B. In an object detection process to be described with reference to FIGS. 2A through 7, an object region may be represented as a bounding box surrounding an object but may not be limited thereto. In an example, when a semantic segmentation is used, the object region may be represented as a contour of the object which is not a quadrangular form such as the bounding box.

Referring to FIG. 2A, a whole-body image of a person and a face of the person may be detected in two stages by implementing a two-stage object detection operation. In an example, after an object, for example, a whole-body image of a person, is detected in an input image 210, an ROI may be detected from the detected object. Although a human figure is illustrated in FIG. 2A, this is only an example, and other objects, for example, animals, vehicles, or aircrafts, as only examples, may be implemented.

In the input image 210, a ground truth 230 on an object region, and an anchor box 220, which is a bounding box candidate for determining the object region are illustrated. A difference between the anchor box 220 and the ground truth 230 may be predicted based on a model trained by deep learning.

For example, the ground truth 230 on the object region may include information on coordinates $(x_{GT}, y_{GT})$ of a center 235, a width $w_{GT}$, and a height $h_{GT}$, and the anchor box 220 may include information on coordinates $(x_a, y_a)$ of a center 225, a width $w_a$, and a height $h_a$.

To detect the object region, for example, the entire body of a person, the deep learning model may be trained based on Equations 1 through 4 below.

$$x = \frac{x_{GT} - x_a}{w_a} \qquad \text{Equation 1}$$

$$y = \frac{y_{GT} - y_a}{h_a} \qquad \text{Equation 2}$$

$$w = \log \frac{w_{GT}}{w_a} \qquad \text{Equation 3}$$

$$h = \log \frac{h_{GT}}{h_a} \qquad \text{Equation 4}$$

Based on Equations 1 through 4, an object region 240 close to the ground truth 230 may be detected in the input image 210. According to the typical object detection method described with reference to FIG. 2A, an object region may be determined in the input image 210 and a face detection algorithm may be performed on a cropped region of the object region.

A process of detecting a face of a person, which is an ROI, in the object region 240 may be the same as, or similar to, a process of detecting the entire body of the person, which is an object region, in the input image 210. For example, the object region 240 may have a ground truth 260 on the ROI, and a difference between an anchor box 250, which is a bounding box candidate to determine the ROI, and the ground truth 260 may be predicted based on the model trained by deep learning.

In an example, the ground truth 260 on the ROI may include information on coordinates $(x_{GT}, y_{GT})$ of a center 265, a width $w_{GT}$, and a height $h_{GT}$, and the anchor box 250 may include information on coordinates $(x_a, y_a)$ of a center 255, a width $w_a$, and a height $h_a$. The ROI close to the ground truth 260 may be detected in the cropped region, for example, the object region 240, based on Equations 1 through 4 described above.

Face detection may be performed after person detection is performed as described above with reference to FIG. 2, and thus an operation quantity may increase in this case, compared to a case in which the person detection and the face detection are performed simultaneously or in parallel.

Referring to FIG. 2B, a face of a person may be detected. For example, the face, or an ROI, may be detected in an input image 270. The face, which is the ROI, may be detected in the input image 270 as described above regarding the face detection process above in FIG. 2A.

The input image 270 may have a ground truth 290 on the ROI, and a difference between an anchor box 280, which is a bounding box candidate to determine the ROI, and the ground truth 290 may be predicted based on the model trained by deep learning.

The ground truth 290 on the ROI may include information on coordinates $(x_{GT}, y_{GT})$ of a center 295, a width $w_{GT}$, and a height $h_{GT}$, and the anchor box 280 may include information on coordinates $(x_a, y_a)$ of a center 285, a width $w_a$, and a height $h_a$. The ROI close to the ground truth 290 may be detected in the input image 270 based on Equations 1 through 4 described above.

Referring to FIG. 2B, in a non-limiting example, only face detection may be performed on the input image 270, and thus region detection may not be readily performed on a person whose face is hidden, or on a rear view of a person.

Referring to FIGS. 3 through 7, a method of performing object or whole-person detection and face detection in parallel and displaying on an input image a feature point of a face when the face of a person is captured and a feature point of the person when the face is not captured will be described in detail.

Figure 3:
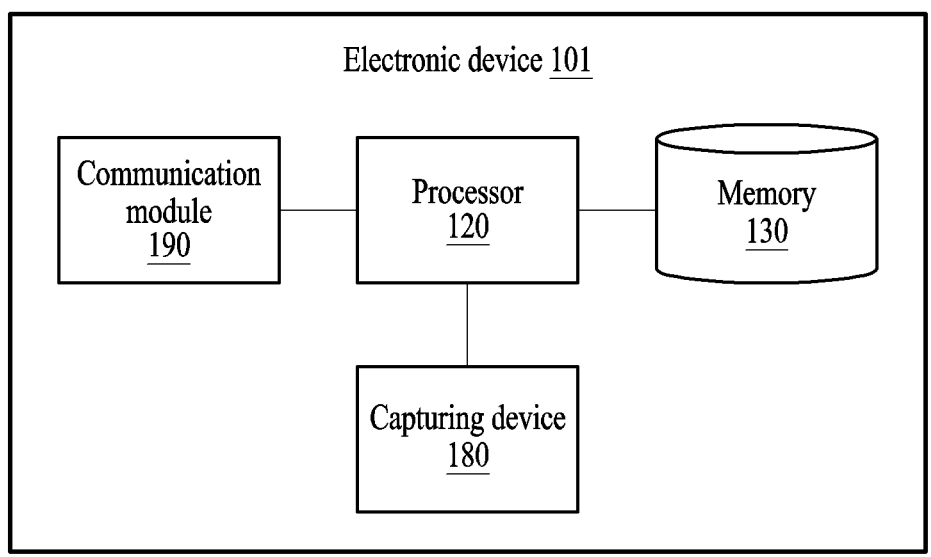
FIG. 3 illustrates an example electronic device, in accordance with one or more embodiments.

FIG. 3 illustrates an example electronic device, in accordance with one or more embodiments.

Referring to FIG. 3, an example electronic device 101 may include a memory 130 configured to store computer-executable instructions, a processor 120 configured to access the memory 130 and execute the computer-executable instructions, and a capturing device 180 that captures an input image on which an object detection is to be performed. Although the capturing device 180 is illustrated as being included in the electronic device 101 in FIG. 3, examples are not limited thereto. For example, the capturing device 180 may be separated from the electronic device 101 and the input image captured by the capturing device 180 may be transmitted to the electronic device 101 via a communication device 190 of the electronic device 101.

The processor 120 may process data received by the communication device 190 and data stored in the memory 130. The processor 120 may be a hardware-implemented data processing device having a physically structured circuit to execute desired operations. The desired operations may include, for example, codes or instructions included in a program. The data processing device may include, for example, a microprocessor, a central processing unit (CPU), a graphics processing unit (GPU), a processor core, a multi-core processor, a multiprocessor, an application-specific integrated circuit (ASIC), and a field-programmable gate array (FPGA).

The processor 120 may execute a computer-readable instructions (e.g., coding) stored in a memory (e.g., the memory 130). The memory 130 may store instructions executable by the processor 120. In a non-limiting example, the processor 120 may be a single processor, or one or more processors. The processor 120 may process data received by the communication device 190 and data stored in the memory 130. A "processor" may be a data processing device implemented as computing hardware including a physically structured circuit to execute desired operations or instructions (e.g., coding), that, when executed by the computing hardware, configure the computing hardware to perform one or more operations and/or methods. Such instructions may be stored in a non-transitory recording medium, for example, that when read and executed by one or more processors or one or more microprocessors, configure the same to perform certain operations or methods. The data processing device refers to structure, as electronic hardware or computing hardware that performs one or more features of the present disclosure.

The memory 130 may store data received by the communication device 190 and data processed by the processor 120. For example, the memory 130 may store instructions (e.g., coding). The stored instructions may be a set of syntaxes executable by the processor 120 after being coded to detect an object based on the input image obtained by the capturing device 180.

The memory 130 may include, as non-limiting examples, one or more volatile memory, non-volatile memory, random-access memory (RAM), flash memory, hard disc drive, and optical disc drive. The memory 130 may store an instruction set (e.g., coding) to operate the electronic device 101. The instruction set to operate the electronic device 101 may be executed by the processor 120.

The capturing device 180 may be, as a non-limiting example, a camera and may include an image sensor. In an example, an input image obtained by the capturing device 180 may be a red, green, blue (RGB) image.

The communication device 190 may be connected to the processor 120 and the memory 130 to transmit and receive data. The communication device 190 may be connected to another external device and receive data therefrom. Hereinafter, transmitting and receiving "A" may refer to transmitting and receiving "information or data indicating A." In a non-limiting example, the communication device 190 may be implemented as a circuitry in the electronic device 101. In an example, the communication device 190 may include an internal bus and an external bus. In another example, the communication device 190 may be an element that connects the electronic device 101 to an external device or a server. In an example, the communication device 190 may be an interface.

Referring to FIGS. 4 through 7, detecting an object from an input image by the electronic device 101 will be described in detail.

Figure 4:
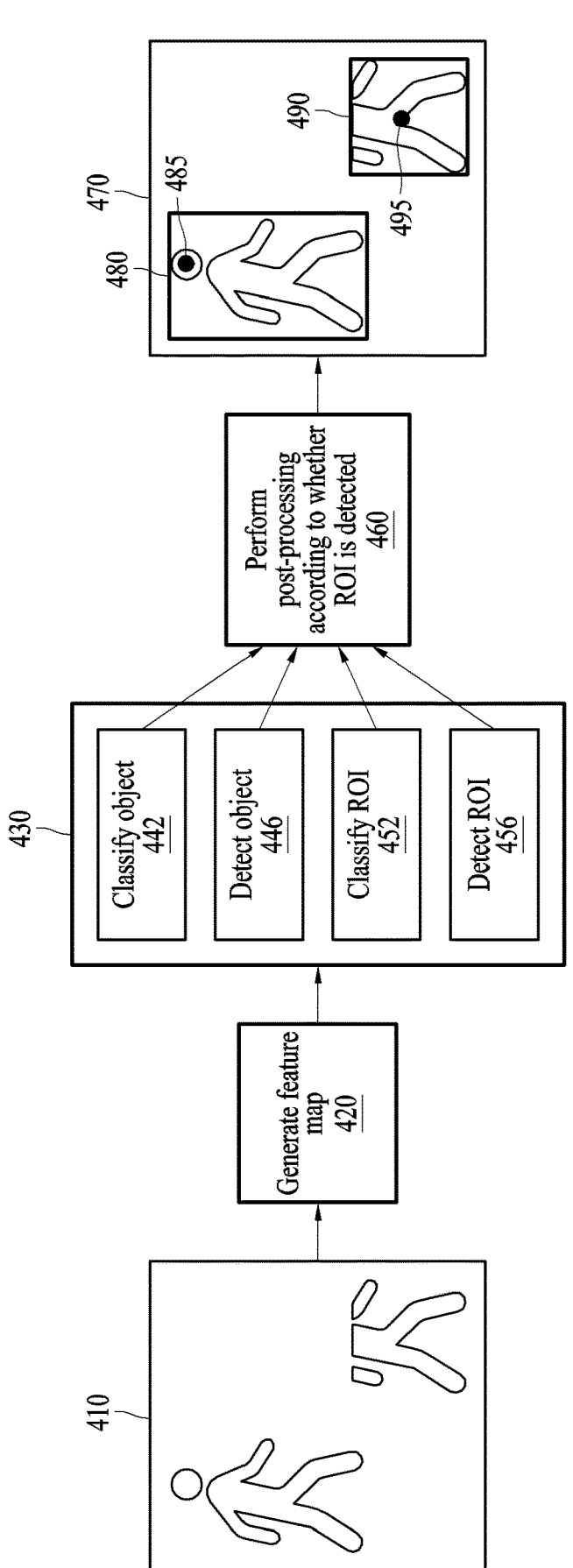
FIG. 4 illustrates an example of processing an image by an example electronic device, in accordance with one or more embodiments.

FIG. 4 illustrates an example of processing an image by an example electronic device 101, in accordance with one or more embodiments.

In an example, in operation 420, the processor 120 of the electronic device 101 may generate a feature map from an input image 410. In an example, the feature map may be generated based on ShuffleNet V2, which is a CNN.

In operation 430, the processor 120 may determine an object region and an ROI from the input image 410 based on the feature map.

The processor 120 may classify one or more objects included in the input image 410 in operation 442 and determine one or more object regions including the objects and detect the objects in operation 446. The object may include, as a non-limiting example, a person whose face is hidden, or whose portion of the body is hidden.

The processor 120 may classify an ROI included in a portion of the one or more objects based on the feature map in operation 452 and determine the ROI included in the input image 410 and detect the ROI in operation 456. The ROI may be a region corresponding to the face of the person.

In an example, operation 442 of classifying the objects and operation 446 of determining the object region and detecting the objects, and operation 452 of classifying the ROI and operation 456 of determining and detecting the ROI may be performed simultaneously or in parallel. As described above with reference to FIGS. 2A and 2B, the object region and the ROI may be detected based on bounding box regression.

In operation 430, object region detection and ROI detection may be performed in one operation unlike the method described above with reference to FIG. 2A, and thus an anchor box implemented as a candidate bounding box for the object region detection and an anchor box implemented as a candidate bounding box for the ROI detection may be the same. That is, in the method described above with reference to FIG. 2A, an anchor box (e.g., the anchor box 220 in FIG. 2A) may be implemented for the object region detection, and another anchor box (e.g., the anchor box 250 in FIG. 2A) may be implemented for the ROI detection. However, the electronic device 101 may detect the object region and the ROI with one anchor box.

In an example, the processor 120 may train a deep learning model to detect an object region and an ROI based on Equations 5 and 6 below, not Equations 1 through 4 described above.

$$x = \frac{x_{GT} - x_a}{w_a} \quad \text{Equation 5}$$

$$y = \frac{y_{GT} - y_a - 0.25 * h_a}{0.5 * h_a} \quad \text{Equation 6}$$

As described above with reference to FIGS. 2A and 2B, ($x_{GT}$, $y_{GT}$) denote center coordinates of a ground truth on the object region or the ROI, $w_{GT}$ denotes a width of the ground truth, and $h_{GT}$ denotes a height of the ground truth. ($x_a$, $y_a$) denote center coordinates of the anchor box, $w_a$ denotes a width of the anchor box, and $h_a$ denotes a height of the anchor box.

Operation 420 of generating the feature map from the input image 410 and operation 430 of simultaneously performing object classification and detection and ROI classification and detection will be described in detail with reference to FIGS. 5A through 5D.

In an example, the processor 120 may perform processing differently for an object according to whether an ROI is detected in operation 460 and display an indicator on the input image 410 in operation 470.

For a first object where the ROI is determined, the processor 120 may display on the input image 410 an indicator that may identify a first object region of the first object and a feature point of a first ROI of the first object. For a second object where the ROI is not determined, the processor 120 may display on the input image 410 an indicator that may identify a second object region of the second object and a feature point of the second object region.

For example, the input image 410 may include a person whose face is not hidden and a person whose face is hidden, and the processor 120 may display different indicators for the two persons. In an example, the processor 120 may display an indicator 485 to identify an object region 480 and a feature point of the ROI for the person whose face is not hidden. In another example, the processor 120 may display an indicator 495 to identify an object region 490 and a feature point of the object region 490 for the person whose face is hidden.

In an example, a feature point of a first ROI and a feature point of a second object region may be preset coordinates. In an example, the first ROI or the second object region may be a bounding box, and an intersection point of two diagonals of the bounding box may be preset as the feature point. In another example, a feature point of an ROI, which is a region corresponding to a face, may be preset as coordinates corresponding to a nose. In another example, a feature point of an object region may be preset as coordinates corresponding to the center of mass.

After operation 430 of object classification, object detection, ROI classification, and ROI detection, operation 460 of processing objects differently according to whether an ROI is detected may be performed as described with reference to FIG. 6.

FIGS. 5A through 5D illustrate an example of generating a feature map from an input image, and detecting an object and an ROI in the input image by an electronic device, in accordance with one or more embodiments.

Figure 5A:
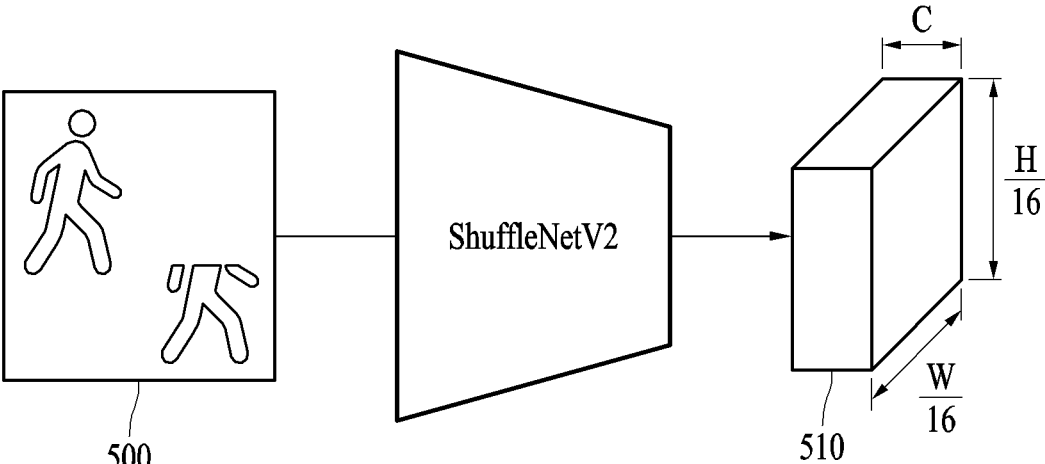
FIGS. 5A, 5B, 5C, and 5D illustrate an example of generating a feature map from an input image, and detecting an object and an ROI by an example electronic device, in accordance with one or more embodiments.

Referring to FIG. 5A, a feature map 510 to perform object detection may be generated from an input image 500 based on ShuffleNet V2. W denotes a width of the input image 500 and H denotes a height of the input image 500.

In an example, the input image 500 may be input to ShuffleNet V2, and the feature map 510 may be output therefrom. A size of the feature map 510 may be $$\frac{H}{16} \times \frac{W}{16} \times C,$$

and C denotes the number of channels of the feature map 510.

Figure 5B:
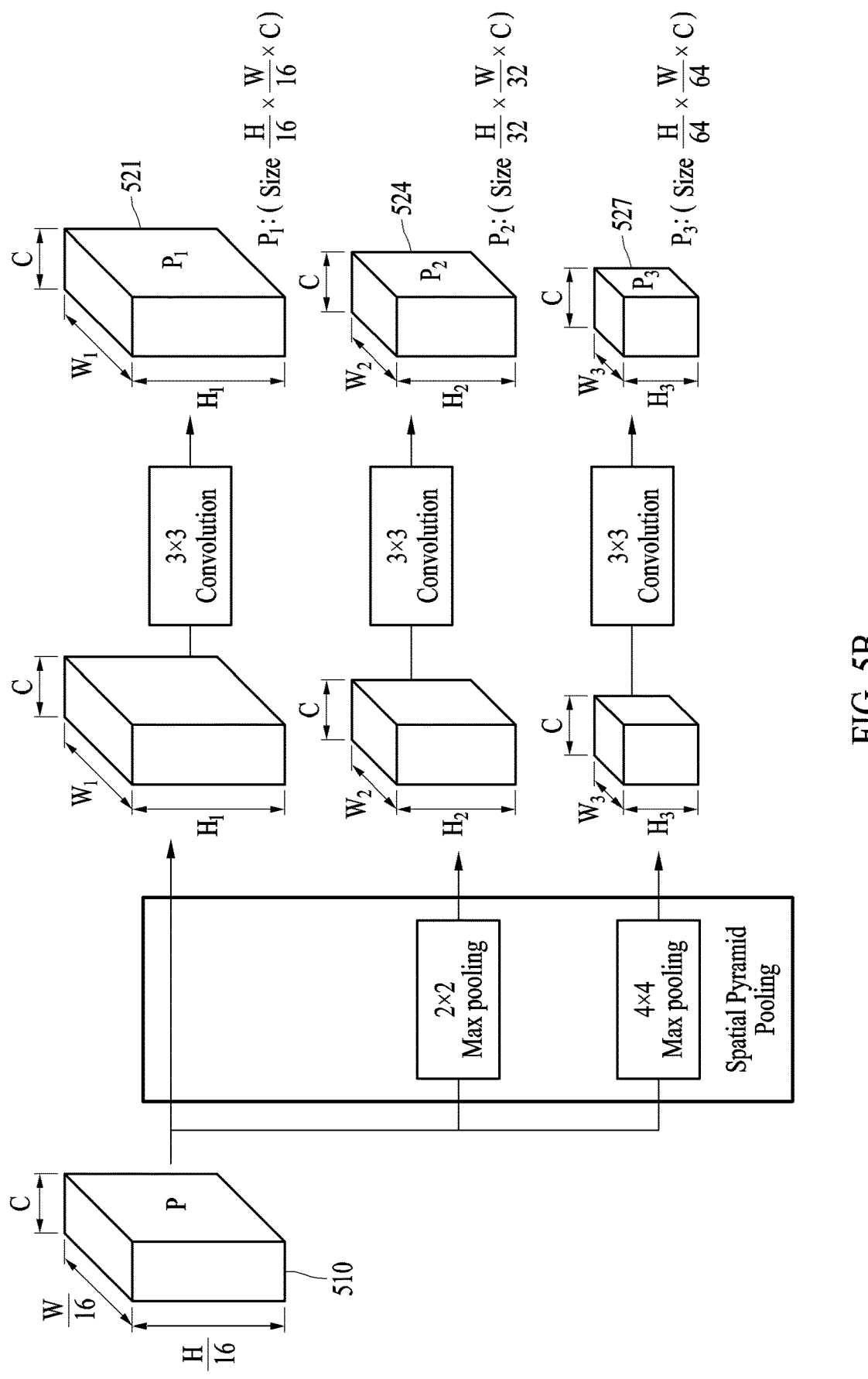

Referring to FIG. 5B, intermediate results P1 521, P2 524, and P3 527 may be generated from the feature map 510 based on a spatial pyramid pooling network (SPPnet).

In an example, the intermediate result P1 521 may be generated through 3×3 convolution after spatial pyramid pooling is performed on the feature map 510, and a size of P1 521 may be $$\frac{H}{16} \times \frac{V}{16} \times C.$$

In an example, the intermediate result P2 524 may be generated through the 3×3 convolution after 2×2 max pooling is performed based on the spatial pyramid pooling on the feature map 510, and a size of P2 524 may be $$\frac{H}{32} \times \frac{W}{32} \times C.$$

In an example, the intermediate result P3 527 may be generated through the 3×3 convolution after 4×4 max pooling is performed based on the spatial pyramid pooling on the feature map 510, and a size of P3 527 may be $$\frac{H}{64} \times \frac{W}{64} \times C.$$

Figure 5C:
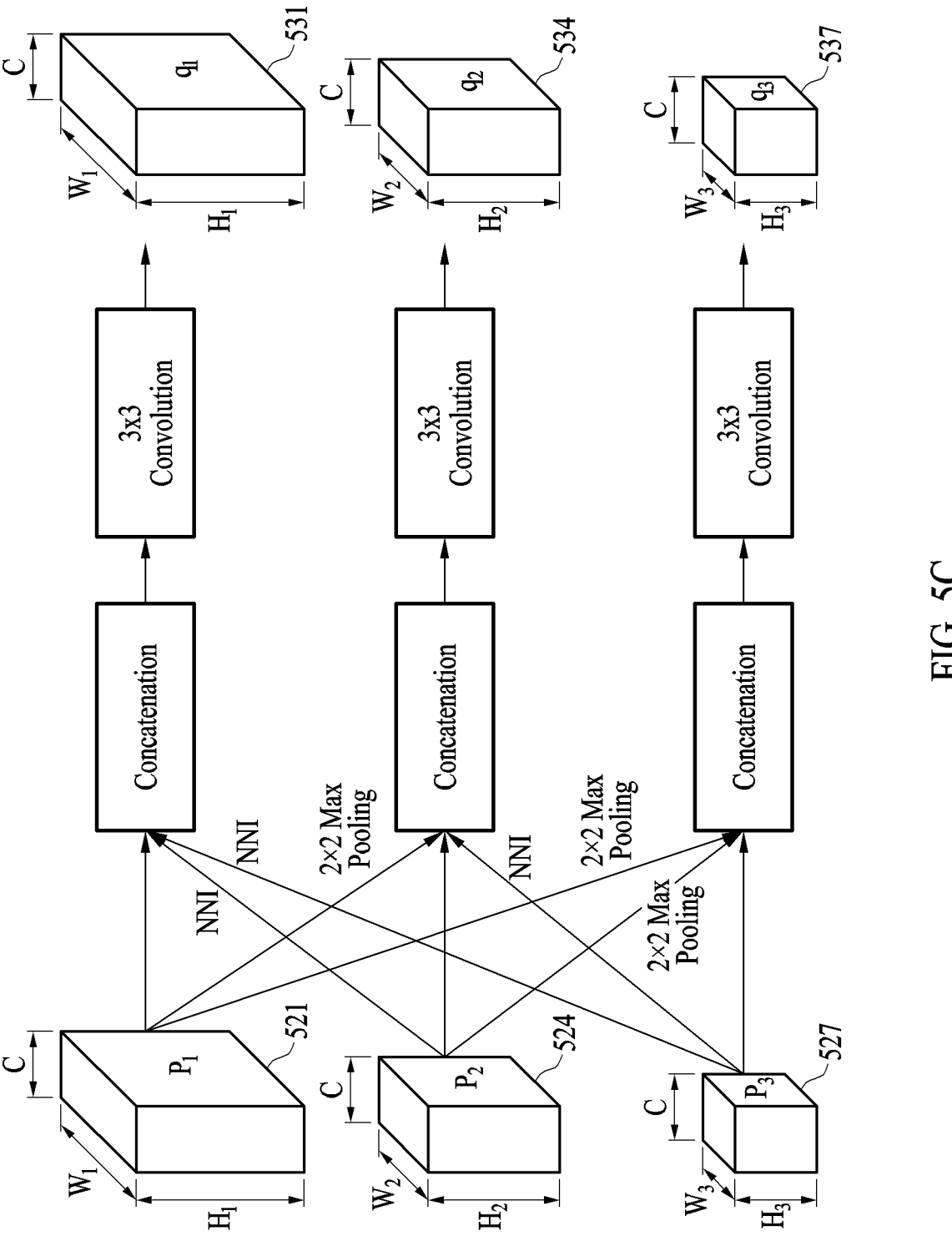

Referring to FIG. 5C, final results q1 531, q2 534, and q3 537 of feature extraction may be respectively generated from P1 521, P2 524, and P3 527.

In an example, the processor 120 of the electronic device 101 may perform nearest neighbor interpolation (NNI) on P2 524 and P3 527. Concatenation may be performed on P1 521, and on P2 524 and P3 527 obtained through the NNI, and q1 531 may be generated through the 3×3 convolution. A size of q1 531 may be $$\frac{H}{16} \times \frac{W}{16} \times C$$

as with the size of p1 521.

In an example, the processor 120 of the electronic device 101 may perform the 2×2 max pooling on P1 521 and the NNI on P3 527. The concatenation may be performed on P1 521 obtained through the 2×2 max pooling, P3 527 obtained through the NNI, and P2 524, and q2 534 may be generated through the 3×3 convolution. A size of q2 534 may be $$\frac{H}{32} \times \frac{W}{32} \times C$$

as with the size of P2 524.

In an example, the processor 120 of the electronic device 101 may perform the 2×2 max pooling on P1 521 and P2 524. The concatenation may be performed on P3 527 and on P1 521 and P2 524 obtained through the 2×2 max pooling, and q3 537 may be generated through the 3×3 convolution. A size of the q3 537 may be $$\frac{H}{64} \times \frac{W}{64} \times C$$

as with the size of P3 527.

Figure 5D:
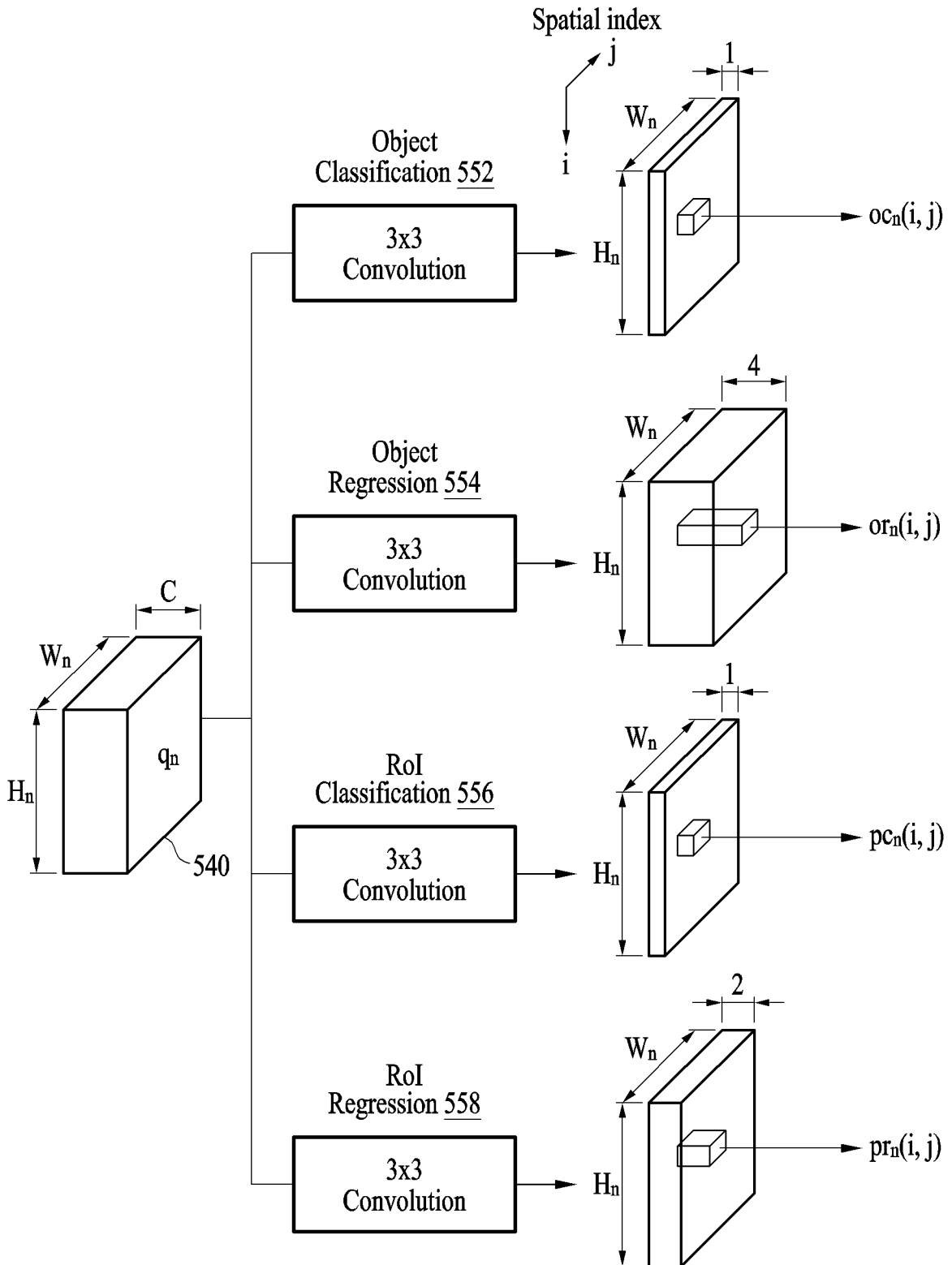

Referring to FIG. 5D, an object may be classified based on a final result $q_n$ 540 of feature extraction in operation 552, the object may be detected through object regression in operation 554, an ROI may be classified in operation 556, and the ROI may be detected through ROI regression in operation 558.

The final result $q_n$ 540 of feature extraction in FIG. 5D may be q1 531, q2 534, and q3 537 described with reference to FIG. 5C.

In an example, the 3×3 convolution may be performed on $q_n$ (e.g., n=1, 2, and 3), and $oc_n$ (i, j) corresponding to a heatmap on an object may be obtained based on the object classification performed in operation 552. $oc_n$(i, j) is a prediction value of probability that the object is on coordinates (i, j) and may have a value between 0 and 1. When $oc_n$(i, j) is greater than or equal to a threshold value (e.g., 0.6), the processor 120 of the electronic device 101 may determine that the object (e.g., a person whose face is not hidden and a person whose face is hidden) is included in the input image 500.

In an example, the 3×3 convolution may be performed on $q_n$ (e.g., n=1, 2, and 3), and a feature point of the object may be obtained as a result of the regression analysis performed on the object region in operation 554. For example, $or_n$(i, j) may be obtained based on a learning model on a ground truth (e.g., the ground truth 235 of the feature point of the object described above with reference to FIG. 2A) as a result of determining an object region based on regression. $or_n$(i, j) may include coordinate information on the feature point of the object and width information and height information of a bounding box corresponding to the object region.

In an example, the 3×3 convolution may be performed on $q_n$ (e.g., n=1, 2, and 3), and $pc_n$ (i, j) corresponding to a heatmap on an ROI may be obtained based on the ROI classification performed in operation 556. $pc_n$(i, j) is a prediction value of probability that the ROI is on coordinates (i, j) and may have a value between 0 and 1. When $pc_n$(i, j) is greater than or equal to a threshold value (e.g., 0.3), the processor 120 of the electronic device 101 may determine that the ROI (e.g., a face of a person) may be included in the input image 500.

In an example, the 3×3 convolution may be performed on $q_n$ (e.g., n=1, 2, and 3), and a feature point of the ROI may be obtained as a result of the regression analysis performed on the ROI in operation 558. For example, $pr_n$(i, j) may be obtained based on a learning model on a ground truth (e.g., the ground truth 265 of the feature point of the ROI described above with reference to FIG. 2A or the ground truth 295 of the feature point of the ROI described above with reference to FIG. 2B) as a result of determining an ROI based on regression. $pr_n$(i, j) may include coordinate information on the feature point of the ROI and width information and height information of a bounding box corresponding to the ROI.

As described above with reference to FIG. 4, objects included in an input image may be processed differently according to whether an ROI is detected after an object classification, and object detection, ROI classification, and ROI detection are performed. A method of differently processing the objects where an ROI is determined and an object where the ROI is not determined in an input image will be described in detail with reference to FIG. 6.

Figure 6:
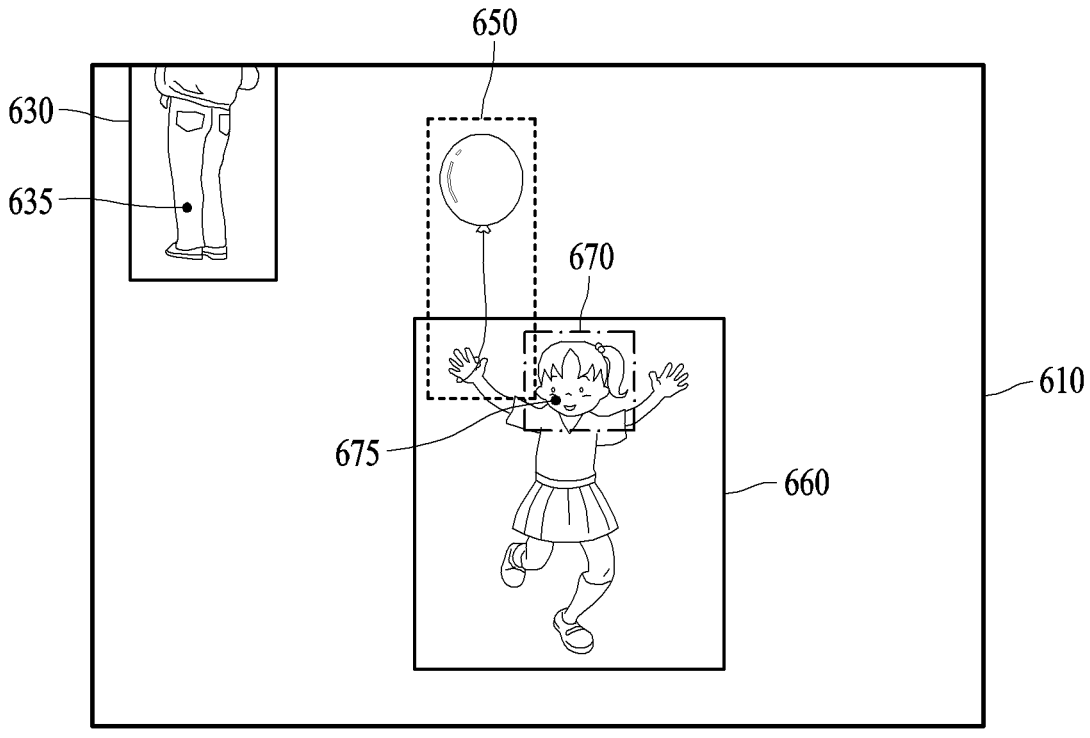
FIG. 6 illustrates an example result of image processing performed by an example electronic device, in accordance with one or more embodiments.

FIG. 6 illustrates an example result of image processing performed by an electronic device, in accordance with one or more embodiments.

Referring to FIG. 6, objects included in an input image 610 may be processed differently according to whether an ROI is detected. Processing an object may refer to displaying a recognizable indicator on at least any one of an object region, a feature point of the object region, and the feature point of an ROI in the input image 610. Processing the objects included in the input image 610 may be performed by the processor 120 of the electronic device 101 described above with reference to FIG. 3.

As described above with reference to FIG. 4 and FIGS. 5A through 5D, the processor 120 of the electronic device 101 may generate a feature map from the input image 610, classify an object based on the feature map, determine an object region, classify an ROI in the object region, and determine the ROI. In the example described with reference to FIG. 6, the object may be at least a portion of a person, and the ROI may be a face of the person. In an example, the processor 120 may classify a person whose face is hidden and a person whose face is not hidden in the input image 610.

In an example, the processor 120 may classify a first object where the ROI is determined and a second object where the ROI is not determined. For the first object, the processor 120 may display on the input image an indicator that may identify a first object region and a feature point of a first ROI on the first object. The indicator may be displayed as a dot in FIG. 6. However, this is only an example, and the indicator may be displayed in various ways.

In an example, the processor 120 may display an indicator that may identify a first object region 660 and an indicator 675 that may identify a feature point of a first ROI 670 on an image, for example, a girl (i.e., the first object where the face, or the ROI, is determined) in the input image 610. In the example described with reference to FIG. 6, the ROI may be the face in the image and the feature point of the ROI may be coordinates corresponding to the nose.

For the second object where the ROI is not determined, the processor 120 may display on an input image an indicator that may identify a second object region and a feature point of the second object region.

In an example, the processor 120 may display a second object region 630 and an indicator 635 that may identify a feature point of the second object region 630 for a person, (i.e., the second object of which the face, or the ROI, is not determined) where only the lower body of the person is captured in the input image 610. In the example described with reference to FIG. 6, the object region may be a region of at least a portion of a person, and the feature point of the object region may be coordinates corresponding to a center point or a center of mass of a bounding box.

Although the post-processing performed by the processor 120 of the electronic device 101 according to whether a face is determined on a person is described herein, this is only a non-limiting example. The processor 120 may classify an object which is not a person, and may determine an object region in the object. For example, referring to FIG. 6, the processor 120 may display an object region 650 on a balloon which is not a person.

Figure 7:
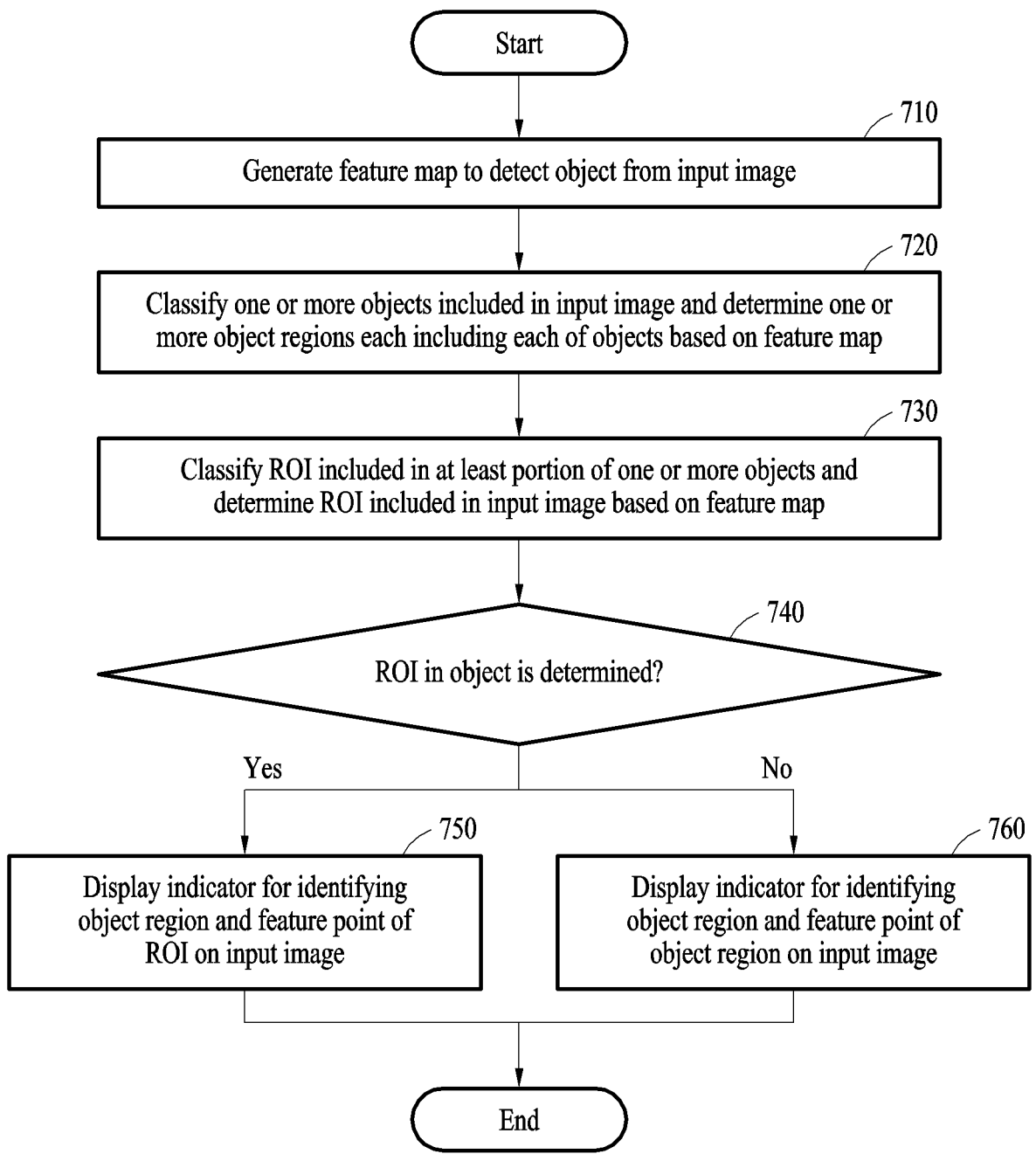
FIG. 7 illustrates an example operating method of an example electronic device, in accordance with one or more embodiments.

FIG. 7 illustrates an example operating method of an example electronic device 101, in accordance with one or more embodiments. The operations in FIG. 7 may be performed in the sequence and manner as shown. However, the order of some operations may be changed, or some of the operations may be omitted, without departing from the spirit and scope of the shown example. Additionally, operations illustrated in FIG. 7 may be performed in parallel or simultaneously. One or more blocks of FIG. 7, and combinations of the blocks, can be implemented by special purpose hardware-based computer that perform the specified functions, or combinations of special purpose hardware and instructions, e.g., computer or processor instructions. In addition to the description of FIG. 7 below, the descriptions of FIGS. 1-6 are also applicable to FIG. 7 and are incorporated herein by reference. Thus, the above description may not be repeated here for brevity purposes. The operations of FIG. 7 may be performed by a processor.

Referring to FIG. 7, operations 710 through 760 may be performed by the processor 120 of the electronic device 101 described above with reference to FIG. 3. Operations 710 through 760 may be performed by the processor 120 of the electronic device 101 for an image processing method described above with reference to FIGS. 3 through 6.

In operation 710, the processor 120 may generate a feature map to perform an object detection from an input image. In an example, as described above with reference to FIG. 5A, the feature map may be generated based on ShuffleNet V2.

In operation 720, the processor 120 may classify one or more objects included in the input image based on the feature map, and determine one or more object regions including the one or more objects.

In operation 730, the processor 120 may classify an ROI included in at least a portion of the one or more objects included in the input image based on the feature map and determine the ROI included in the input image.

As described above with reference to operation 430 of FIG. 4 and FIG. 5D, operations 720 and 730 may be performed simultaneously or in parallel.

In operation 740, the processor 120 may determine whether the ROI is determined in an object. In an example, the processor 120 may determine whether a face (or the ROI) of a person (or the object) is included in the input image.

For a first object where the ROI is determined, in operation 750, the processor 120 may display on the input image an indicator that may identify a first object region of the first object and a feature point of a first ROI on the first object.

For a second object where the ROI is not determined, in operation 760, the processor 120 may display on the input image an indicator that may identify a second object region of the second object and a feature point of the second object region.

The communication device 190, processor 120, memory 130, capturing device 180, and other devices, and other components described herein are implemented as, and by, hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application, and illustrated in FIGS. 1-7, are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller, e.g., as respective operations of processor implemented methods.

One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that be performed by the hardware components and the methods as described above. In one example, the instructions or software include machine code that is directly executed by the one or more processors or computers, such as machine code produced by a compiler. In another example, the instructions or software include higher-level code that is executed by the one or more processors or computers using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), EEPROM, RAM, DRAM, SRAM, flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors and computers so that the one or more processors and computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A processor-implemented image processing method, the method comprising:

performing an inference operation including object detection by:

generating a feature map from an input image;

classifying one or more objects included in the input image based on the feature map, determining, in the input image, a first object region comprising a first object based on the generated feature map; and determining whether the first object region includes a region of interest (ROI) based on the generated feature map, wherein a same anchor box is used for determining the first object region and for determining whether the first object region includes the ROI;

controlling, based on classifying the first object as a target object, a displaying of an indicator, depending on whether the first object region includes the ROI or not, including:

displaying a first indicator within the ROI that identifies a feature point of the ROI in response to the first object region including the ROI; and displaying a second indicator within the first object region that identifies a feature point of the first object region in response to the first object region not including the ROI, wherein the first indicator and the second indicator are different, and controlling, based on classifying a second object as not corresponding to the target object, a displaying a second object region for the second object.

2. The method of claim 1, wherein the input image is a red, green, and blue (RGB) image.

3. The method of claim 1, wherein the feature map is generated based on ShuffleNet V2.

4. The method of claim 1, wherein:

the target object is at least a portion of a person, and the ROI is a region corresponding to a face of the person.

5. The method of claim 4, wherein:

coordinates of the first indicator correspond to coordinates of a nose of the face of the person.

6. The method of claim 1, wherein the feature point of the ROI and the feature point of the first object region are preset coordinates.

7. The method of claim 1, wherein the first object region and the ROI are determined based on bounding box regression.

8. A non-transitory computer-readable storage medium storing instructions that, when executed by a processor, cause the processor to perform the image processing method of claim 1.

9. The method of claim 1, wherein:

coordinates of the second indicator correspond to coordinates of a center of mass of the second object region.

10. A device, comprising:

one or more processors, configured to:

perform an inference operation including object detection by:

generating a feature map from an input image;

classifying one or more objects included in the input image based on the feature map;

determining, in the input image, a first object region comprising a first object based on the generated feature map; and determining whether the first object region includes a region of interest (ROI) based on the generated feature map, wherein a same anchor box is used for determining the object region and for determining whether the object region includes the ROI;

control, based on classifying the first object as a target object, a displaying of an indicator, depending on whether the object region includes the ROI or not, including:

displaying a first indicator within the ROI that identifies a feature point of the ROI in response to the first object region including the ROI; and displaying a second indicator within the first object region that identifies a feature point of the first object region in response to the first object region not including the ROI, wherein the first indicator and the second indicator are different, and control, based on classifying a second object as not corresponding to the target object, a displaying a second object region for the second object.

11. The device of claim 10, further comprising a memory, storing instructions that, when executed by the processor, configures the processor to perform the inference operation and control the displaying of the indicator.

12. The device of claim 10, further comprising a capturing device configured to capture the input image.

13. The device of claim 10, wherein the input image is a red, green, and blue (RGB) image.

14. The device of claim 10, wherein the feature map is generated based on ShuffleNet V2.

15. The device of claim 10, wherein:

the target object is at least a portion of a person, and the ROI is a region corresponding to a face of the person.

16. The device of claim 15, wherein:

coordinates of the first indicator correspond to coordinates of a nose of the face of the person.

17. The electronic device of claim 10, wherein the feature point of the ROI and the feature point of the first object region are preset coordinates.

18. The device of claim 10, wherein:

coordinates of the second indicator correspond to coordinates of a center of mass of the second object region.

\*　\*　\*　\*　\*